UNITED STATES PATENT OFFICE.

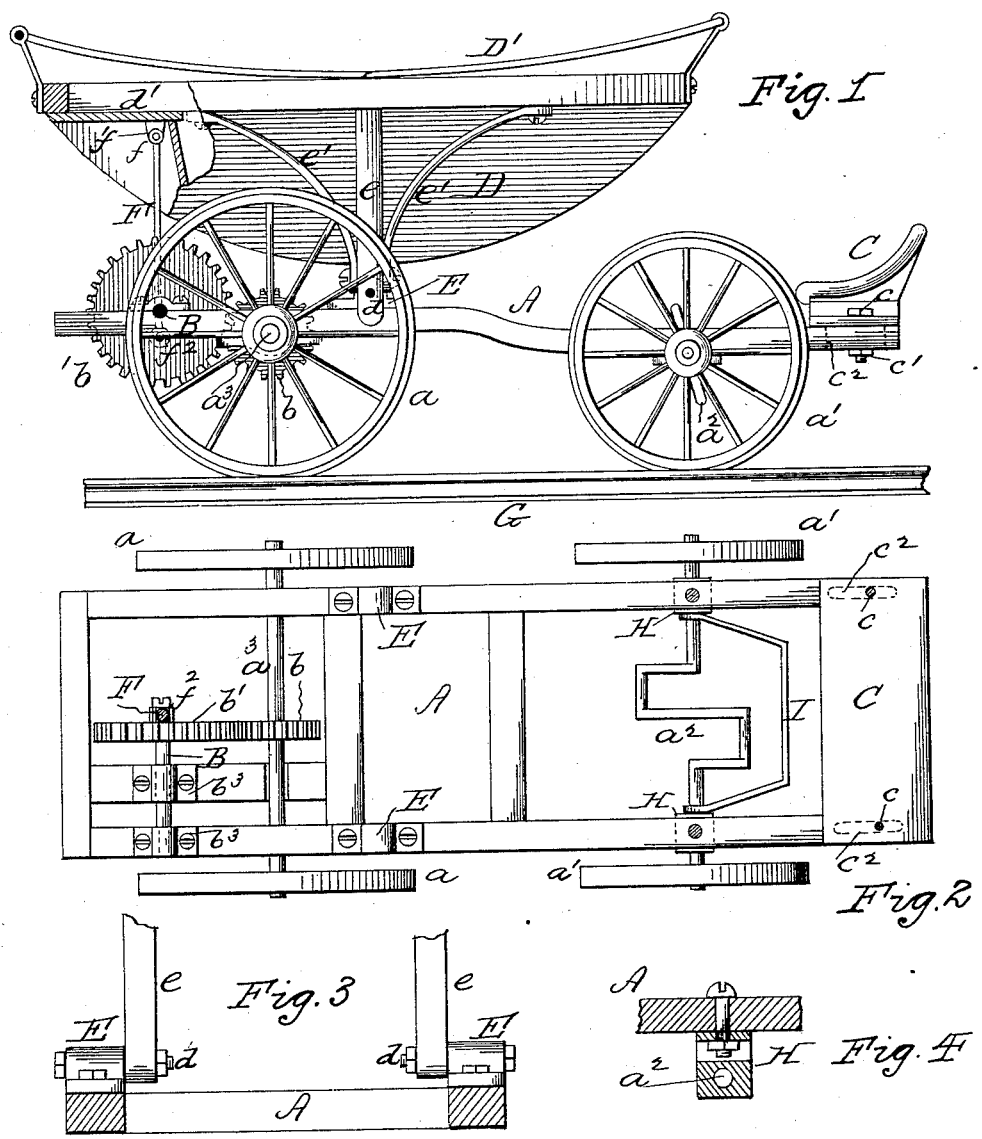

JOHN C. CLIME, OF PHILADELPHIA, PENNSYLVANIA.

VELOCIPEDE.

SPECIFICATION forming part of Letters Patent No. 315,003, dated April 7, 1885.

Application filed August 15, 1883. Renewed August 14, 1884. (No model.)

*To all whom it may concern:*

Be it known that I, JOHN C. CLIME, a citizen of the United States, residing at Philadelphia, in the county of Philadelphia and State of Pennsylvania, have invented certain new and useful Improvements in Combined Velocipede and Carriage, of which the following is a specification, reference being had therein to the accompanying drawings, wherein—

Figure 1 is a sectional elevation of my invention. Fig. 2 is a plan of the running-gear of same, adapted for street or road use; and Figs. 3 and 4 are sectional details.

My invention has for its object to provide a combined velocipede and carriage having a tilting or rocking body, and which may be used for street or road purposes, or placed upon tracks to form a merry-go-round.

My invention accordingly consists of the novel combination, construction, and arrangement of parts, as hereinafter described and claimed, comprising a velocipede having a pivoted body or car in gear with one of the axles of the velocipede, whereby as the latter is impelled said body is rocked or oscillated.

In the drawings, A represents a frame mounted upon wheels $a\ a'$, of which, as shown, the former is of a larger diameter than that of the latter; but they may be otherwise sized and arranged, as desired. Said frame A may be constructed in any suitable manner, and be of any desired configuration. The wheels $a'\ a'$ are secured to or mounted upon a double crank or driving axle, $a^2$, while the axle $a^3$ for wheels $a$ is plain or straight, but has secured to it a pinion, $b$, which meshes with a gear-wheel, $b'$, affixed to shaft B, having bearings in boxes $b^3$, secured to the frame, as more plainly shown in Fig. 2.

Upon frame A and at a suitable distance from the axle $a^2$ is a seat, C, which is secured in position by bolts $c\ c$ and jam-nuts $c'\ c'$. Said bolts pass through slots $c^2$ in the frame A, so that by loosening the nuts $c'$ the seat C may be moved on frame A, and adjusted to and from the double-crank axle $a^2$.

If desired, the slots $c^2$ may be formed in the bottom board of seat C, instead of in the frame A; or in lieu of said slots a series of holes may be arranged either in said seat or frame.

D represents the carriage-body, pivoted at $d$ to the frame A or to lugs E secured thereto. Said body is preferably formed with side pieces or standards, $e\ e$, through which the pivot-bolts pass, as more plainly shown in Fig. 3; and $e'\ e'$ are braces secured to said body and its standards. The body D is provided at each end with seats $d'$, or they may be otherwise arranged, as desired.

F represents a connecting-bar, the end $f$ of which is pivoted at $f'$ to the body D, and its remaining end, $f^2$, is eccentrically connected or journaled to the gear-wheel $b'$, so that as the frame or carriage A is moved or propelled by rotating the shaft $a^2$, the pinion $b$ and wheel $b'$ are rotated to move rod F, and cause it to impart a rocking or oscillating motion to body D. The extent of such rocking will depend upon the degree of eccentric connection of the rod F with wheel $b'$, and the number of oscillations will be governed by relative proportions of the diameters of the pinion $b$ and gear-wheel $b'$, so that by altering the proportions of the latter and varying the eccentric connection of rod F the extent and number of oscillations for the body D may be regulated as desired.

When the foregoing-described device is used as a merry-go-round, or placed upon tracks G, as illustrated in Fig. 1, the wheels $a\ a'$ are provided with peripheral flanges, grooves, or otherwise suitably formed; but when designed for street or road use said wheels are flangeless, and the axle $a^2$ has pivoted bearings H, as plainly shown in Figs. 2 and 4; and I is a steering rod or bail therefor, to guide the velocipede in any desired path.

Instead of using the pivoted boxes H and bail I for steering the velocipede A, any other suitable equivalent mechanism may be employed.

The body D may, if desired, be provided with a guard-rail, D', of any fanciful or other design, which is secured thereto in any suitable manner.

What I claim is—

1. In a velocipede, the combination, with a frame having a straight axle, a double-crank axle carrying the propelling-wheels, and a seat for the operator at or near the double crank, of an oscillating or rocking body mounted on said frame, and mechanism connecting the frame and body for rocking the latter, substantially as described.

2. In a velocipede, the combination, with a frame having a straight axle, a double-crank axle carrying the propelling-wheels, having pivoted bearing and a steering-rod, and a seat for the operator at or near the double crank, of an oscillating or rocking body mounted on said frame, and mechanism connecting the frame and body for rocking the latter, substantially as described.

In testimony whereof I affix my signature in presence of two witnesses.

JOHN C. CLIME.

Witnesses:
S. J. VAN STAVOREN,
CHAS. F. VAN HORN.